(12) United States Patent
Peterson (10) Patent No.: US 7,386,188 B2
(45) Date of Patent: *Jun. 10, 2008

(54) MERGING IMAGES TO FORM A PANORAMIC IMAGE

(75) Inventor: John Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/498,948

(22) Filed: Aug. 2, 2006

(65) Prior Publication Data

US 2006/0291747 A1 Dec. 28, 2006

Related U.S. Application Data

(63) Continuation of application No. 09/657,949, filed on Sep. 8, 2000, now Pat. No. 7,095,905.

(51) Int. Cl.
*G06K 9/36* (2006.01)
*G09G 5/00* (2006.01)
*H04N 7/00* (2006.01)

(52) U.S. Cl. .................... 382/284; 348/36; 345/629; 382/173

(58) Field of Classification Search ............... 382/173, 382/284, 293–295; 345/418, 419, 629, 672, 345/678, 683; 348/36, 42, 218.1
See application file for complete search history.

(56) References Cited

U.S. PATENT DOCUMENTS

| 4,057,338 | A |   | 11/1977 | Yevick |
| 5,185,808 | A |   | 2/1993 | Cok |
| 5,481,653 | A | * | 1/1996 | Kashiwagi et al. ......... 345/418 |
| 5,528,290 | A |   | 6/1996 | Saund |
| 5,594,845 | A |   | 1/1997 | Florent et al. |
| 5,657,096 | A |   | 8/1997 | Lukacs |
| 5,706,416 | A | * | 1/1998 | Mann et al. ................ 345/427 |

(Continued)

FOREIGN PATENT DOCUMENTS

| WO | WO 98/02844 | 1/1998 |
| WO | WO 01/88838 | 11/2001 |

OTHER PUBLICATIONS

Bergen et al., "A Three Frame Algorithm for Estimating Two-Component Image Motion", IEEE Transactions on Pattern Analysis and Machine Intelligence, vol. 14 , No. 9 (Sep. 1992), 24 pages.

(Continued)

*Primary Examiner*—Kanjibhai Patel
(74) *Attorney, Agent, or Firm*—Fish & Richardson P.C.

(57) ABSTRACT

Methods, systems, and apparatus, including computer program products, for merging images of segments of a view. Methods include: receiving, from a network, a first image representing a first segment of the view and a second image representing a second segment of the view; determining the position of the second segment of the view relative to the first segment of the view; blending the first image with the second image based on the determined position of the second segment relative to the first segment to form a panoramic image of the view; and transmitting the panoramic image over the network.

10 Claims, 9 Drawing Sheets

U.S. PATENT DOCUMENTS

| | | | |
|---|---|---|---|
| 5,802,202 | A | 9/1998 | Yamada et al. |
| 5,838,837 | A | 11/1998 | Hirosawa et al. |
| 5,920,657 | A | 7/1999 | Bender et al. |
| 5,963,664 | A | 10/1999 | Kumar et al. |
| 5,986,668 | A | 11/1999 | Szeliski et al. |
| 5,987,164 | A | 11/1999 | Szeliski et al. |
| 6,005,545 | A | 12/1999 | Nishida et al. |
| 6,043,837 | A | 3/2000 | Driscoll, Jr. et al. |
| 6,075,905 | A | 6/2000 | Herman et al. |
| 6,078,701 | A | 6/2000 | Hsu et al. |
| 6,081,275 | A | 6/2000 | Kojima |
| 6,084,592 | A | 7/2000 | Shum et al. |
| 6,097,854 | A | 8/2000 | Szeliski et al. |
| 6,128,108 | A | 10/2000 | Teo |
| 6,148,168 | A * | 11/2000 | Hirai et al. ............... 399/301 |
| 6,222,551 | B1 | 4/2001 | Schneider et al. |
| 6,246,412 | B1 | 6/2001 | Shum et al. |
| 6,246,413 | B1 | 6/2001 | Teo |
| 6,249,616 | B1 | 6/2001 | Hashimoto |
| 6,356,297 | B1 | 3/2002 | Cheng et al. |
| 6,385,349 | B1 | 5/2002 | Teo |
| 6,389,179 | B1 | 5/2002 | Katayama |
| 6,411,742 | B1 | 6/2002 | Peterson |
| 6,424,351 | B1 | 7/2002 | Bishop et al. |
| 6,459,451 | B2 | 10/2002 | Driscoll et al. |
| 6,532,036 | B1 | 3/2003 | Peleg et al. |
| 6,535,650 | B1 | 3/2003 | Poulo et al. |
| 6,567,085 | B1 | 5/2003 | Edmark |
| 6,583,815 | B1 | 6/2003 | Driscoll et al. |
| 6,618,511 | B1 | 9/2003 | Mancuso et al. |
| 6,643,413 | B1 | 11/2003 | Shum et al. |
| 6,674,484 | B1 | 1/2004 | Boland et al. |
| 6,704,041 | B2 | 3/2004 | Katayama |
| 6,714,689 | B1 | 3/2004 | Yano et al. |
| 6,734,911 | B1 | 5/2004 | Lyons |
| 6,778,207 | B1 | 8/2004 | Lee et al. |
| 6,788,333 | B1 | 9/2004 | Uyttendaele et al. |
| 7,006,707 | B2 | 2/2006 | Peterson |
| 7,095,905 | B1 | 8/2006 | Peterson |
| 7,103,236 | B2 | 9/2006 | Peterson |
| 7,194,144 | B1 * | 3/2007 | Sakai et al. ............... 382/284 |

OTHER PUBLICATIONS

Burt, et al. "A Multiresolution Spline With Application to Image Mosaics", ACM Transactions on Graphics, vol. 2, No. 4, Oct. 1983, pp. 217-236.

Debevee et al., " Modeling and Rendering Architecture from Photographs: A hybrid geometry-and image-based approach", 1996, ACM Press, pp. 11-20.

Girod, et al. "Direct Estimation of Displacement Histograms", OSA Meeting on Image Understanding and Machine Vision, Cape Cod, MA, Jun. 1989, pp. 1-4.

Paul S. Heckbert, "Fundamentals of Texture Mapping and Image Warping", *Master's Thesis* under the direction of Carlo Séquin, Dept. of Electrical Engineering and Computer Science, University of California , Berkeley, California, Jun. 17, 1989, 89 pages.

Klette et al., "Computer Vision. Three-Dimensional Data From Images", Springer-Verlag Singapore Pte. Ltd. 1998, pp. 48-56.

Mann, et al., "Virtual Bellows: Constructing High Quality Stills from Video", M.I.T Media Laboratory Perceptual Computing Section Technical Report No. 259 Appears, Proc. First IEEE Int. Conf. On Image Proc., Austin, TX, Nov. 1994, pp. 1-5.

Porter, et al. "Compositing Digital Images", Computer Graphics, vol. 18, No. 3, Jul. 1984, pp. 253-259.

Shum et al., "Rendering with Concentric Mosaics," (1999) Microsoft Research, pp. 299-306.

"Stitcher—High Resolution Panoramas—for Professionals Only!" http://www.realviz.com/products/stitcher/index.htm, REALVIZ, S.A. Jun. 15, 2000 (3 Pages).

"Stitcher—Key Features" http://www.realviz.com/products/stitcher/mainfeatures.htm, REALVIZ, S.A. Jun. 15, 2000 (3 Pages).

"Stitcher—Major Features and Benefits" http://www.realviz.com/products/stitcher/majorfeatures.htm, REALVIZ, S.A. Jun. 15, 2000 (2 Pages).

"Stitcher—Success Stories" http://www.realviz.com/products/stitcher/success.htm, REALVIZ, S.A. Jun. 15, 2000 (1 Page).

Szeliski et al., Creating Full View Panoramic Image Mosaics and Environment Maps, Proceedings of the 24th annual conference on Computer graphics and interactive techniques, 1997, 8 pages.

Lance Williams, "Pyramidal Parametrics", Computer Graphics, vol. 17, No. 3, Jul. 1983, pp. 1-11.

Xiong, et al. "Registration, Calibration and Blending in Creating High Quality Panoramas", Applications of Computer Vision, Proceedings of the Fourth IEEE Workshop, Los Alamitos, CA Oct. 19-21, 1998, pp. 69-74.

* cited by examiner

Select C as "base"
Align B, D to C
Align A to B and E to D

MERGING IMAGES TO FORM A PANORAMIC IMAGE

CROSS-REFERENCE TO RELATED APPLICATIONS

This application is a continuation application of and claims priority to U.S. application Ser. No. 09/657,949, filed on Sep. 8, 2000 now U.S. Pat. No. 7,095,905.

BACKGROUND

This invention relates to a server for merging images to form a panoramic image and methods practiced by the server.

Image capture devices, such as cameras, can be used to capture an image of a section of a view, such as a section of the front of a house. The section of the view whose image is captured by a camera is known as the field of view of the camera. Adjusting a lens associated with a camera may increase the field of view. However, there is a limit beyond which the field of view of the camera cannot be increased without compromising the quality, or "resolution", of the captured image. It is sometimes necessary to capture an image of a view that is larger than can be captured within the field of view of a camera. To do so, multiple overlapping images of segments of the view can be taken and then the images can be joined together, or "merged," to form a composite image, known as a panoramic image.

An image captured by a camera distorts the sizes of objects depicted in the image so that distant objects appear smaller than closer objects. The size distortion, which is known as perspective distortion, depends on the camera position, the pointing angle of the camera, and so forth. Consequently, an object depicted in two different images might not have the same size in the two images, because of perspective distortion.

SUMMARY

In one general aspect of the invention, a method of merging images of segments of a view includes: receiving a first image representing a first segment of the view and a second image representing a second segment of the view from a network, determining the position of the second segment of the view relative to the first segment of the view, blending the first image with the second image based on the determined position of the second segment relative to the first segment to form a panoramic image of the view, and transmitting the panoramic image over the network.

In a second general aspect of the invention, an article includes a computer-readable medium, which stores computer-executable instructions for causing a computer to implement the method of the first general aspect of the invention.

Embodiments of the first and second general aspects of the invention may include one or more of the following features. Determining the relative position of the second image and merging the first and second image are performed without the intervention of a human operator. The method further includes determining whether the second image overlaps the first image based on the position of the second segment relative to the first segment and the first image and the second image are only blended when the second image overlaps the first image. Perspective distortion in the second image relative to the first image is corrected prior to blending the first image with the second image. Blending the first image with the second image includes: dividing the second image into a first portion and a second portion based on the position of the second segment relative to the first segment, and compositing the first portion of the second image on the first image at the relative position of the second segment relative to the first segment to produce the panoramic image. The compositing of the first portion of the second image causes the first portion to mask out a part of the first image.

In a third general aspect of the invention, a method of merging images of segments of a view includes: retrieving a set of images representing a view including a first image representing a first segment of the view, a second image representing a second segment of the view, and a third image representing a third segment of the view; determining a first position of the second segment of the view relative to the first segment of the view; determining a second position of the third segment relative to the first segment of the view and a third position of the third segment relative to the second segment of the view; checking whether the first image overlaps the third image more than the second image overlaps the third image based on the second position and the third position; and if the first image overlaps the third image more than the second image overlaps the third image, blending the set of images based on the first position and the second position.

In a fourth general aspect of the invention, an article includes a computer-readable medium, which stores computer-executable instructions for implementing the method of the third general aspect of the invention.

Embodiments of the third and fourth general aspects of the invention may include one or more of the following features. Prior to blending the set of images, perspective distortion in at least one of the set of images is corrected. A central one and peripheral ones of the set of images are determined based on the first and second positions. Overlap areas between the central one and each of the peripheral ones of the set of images are determined, based on the first and second positions. A first peripheral one of the images is selected to maximize the overlap area between the central image and the first peripheral one of the images. Perspective distortion in the first peripheral image is corrected relative to the central image.

A first overlap area is determined between a second one of the peripheral images and the central image and a second overlap area is determined between the second peripheral image and the first peripheral image. If the first overlap area is greater than the second overlap area, perspective distortion in the second peripheral image is corrected relative to the central one of the images. Alternatively, if the first overlap area is less than the second overlap area, perspective distortion is corrected in the second peripheral image relative to the first peripheral image.

The images in the set are then blended as follows. The second image is divided into a first portion and a second portion, based on the first position. The first portion of the second image is composited on the first image, masking out a part of the first image to produce a composite image. The third image is divided into a third portion and a second portion, based on the second position. The third portion is further divided into a fifth portion and a sixth portion, based on the third position. The fifth portion is composited on the composite image based on the second position, masking out a part of the composite image to form the panoramic image.

In a fifth general aspect of the invention, a method of merging images of segments of a view, includes transmitting a first image representing a first segment of the view to a server, transmitting a second image representing a second segment of the view to the server; and receiving a panoramic image of the view from the server. The panoramic image is a composite of the first image and the second image.

In certain instances, the first image is transmitted from a first computer and the second image is transmitted from a second different computer.

The invention can be implemented to realize one or more of the following advantages. The images are merged quickly and seamlessly. Images from collaborating users who are geographically distant from each other may be merged on a central server. Images from a client device that lacks the computing power to merge the images, such as personal digital assistant ("PDA"), may be merged on the server and transmitted to the PDA.

The details of one or more embodiments of the invention are set forth in the accompanying drawings and the description below. Other features and advantages of the invention will become apparent from the description, the drawings, and the claims.

BRIEF DESCRIPTION OF DRAWINGS

Like reference symbols in the various drawings indicate like elements.

DETAILED DESCRIPTION

Figure 1:
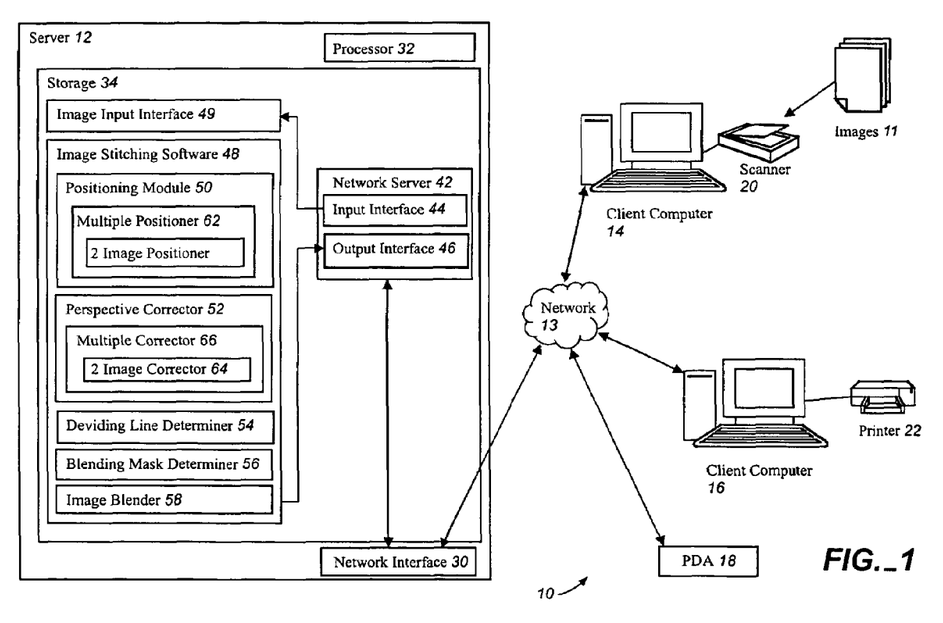
FIG. 1 is a block diagram of a system that includes a server for merging images.

As shown in FIG. 1, a system 10 for merging images 11 includes a server 12 and a network 13, such as the Internet, which connects the server 12 to client computers 14, 16 and a personal digital assistant 18 ("PDA"). Users may, for example, use a scanner 20 to capture digital images 11 and load them onto a client computer 14, before the images are transmitted from the client computer 14 to the server 12 over the network 13. The images 11 depict overlapping segments of a view that is common to all the images and the server 12 merges the images to create a panoramic image of the view. For example, each of the images 11 may represent a segment of the skyline of a city and the server 12 may merge the images to form a panoramic image of the entire skyline. Some of the images merged by the server 12 to form the panoramic image may be transmitted from client computer 14 while others of the images may be transmitted from a different client computer 16, allowing users at different locations to collaborate in creating the panoramic image.

The images used in creating the panoramic image may be transmitted from a device, such as a PDA 18, which may not have sufficient computing power to merge the images. Server 12 transmits the panoramic image to the client computer 16, where a user may either display the panoramic image or print the panoramic image on a printer 22.

Server 12 includes a network interface 30 for transmitting and receiving information, such as images, over the network 13. Server 12 also includes a processor 32 for executing programs and a storage subsystem 34 for storing information such as data or computer programs. The storage subsystem may include a hard disk, a hard disk array, a CD-ROM drive, a floppy drive or memory. The software stored in storage subsystem 34 and executed by the processor 32 includes software implementing a network server 42, such as a web server, with an input interface 44 for receiving information from network interface 30 and an output interface 46 for transmitting information using the network interface 30. The software also includes image-stitching software 48 for merging images and an image input interface 49 for receiving images from the input interface 44 of the network server 42 and conveying the images to the image stitching software 48. The input interface 49 may be an Internet Server Application Programming Interface ("ISAPI") dynamically linked library ("DLL") or some other software for communicating with network server 42.

Image stitching software 48 includes a positioning module 50 for determining the relative positions of the segments of the view represented by the images, a perspective corrector 52 for correcting perspective distortion in the images, a dividing line determiner 54, a blending mask determiner 56 and an image blender 58. The image stitching software will be described in greater detail below.

Figure 2A:
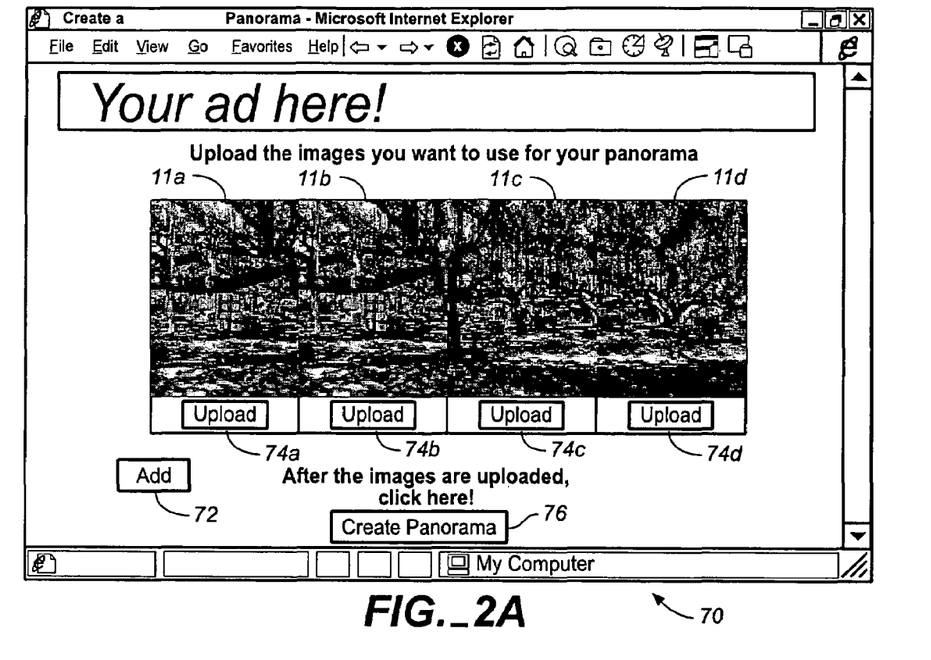
FIG. 2A shows a web page presented by the server of FIG. 1 for transmitting images of overlapping segments of a view to the server.

As shown in FIG. 2A, the network server 42 transmits the web page 70 to a user on client computer 14, 16, 18 to allow the user to send images 11 to the server 12. The user may add images to the web page by clicking on an add button 72. The web page 70 includes images 11a-11d that have been added to the web page 70 using the add button 72. The images 11a-11d depict overlapping segments of a view of a lake. The user may transmit each of the images 11a-11d by clicking on an upload button 74a-74d that corresponds to the image. The user directs the server 12 to create a panoramic image from the uploaded images by clicking on a create button 76, causing client computer 14, 16, 18 to transmit the images to the server 12 through the network 13. The input interface 44 of the network server 42 receives the images 11a-11d through the network interface 30 and conveys them to the image input interface 49, which in turn conveys the images 11a-11d to the image stitching software 48. The images stitching software 48 merges the images 11a-11d to form a panoramic image of the entire view of the scene, which it conveys to the output interface 46 of the network server 42.

Figure 2B:
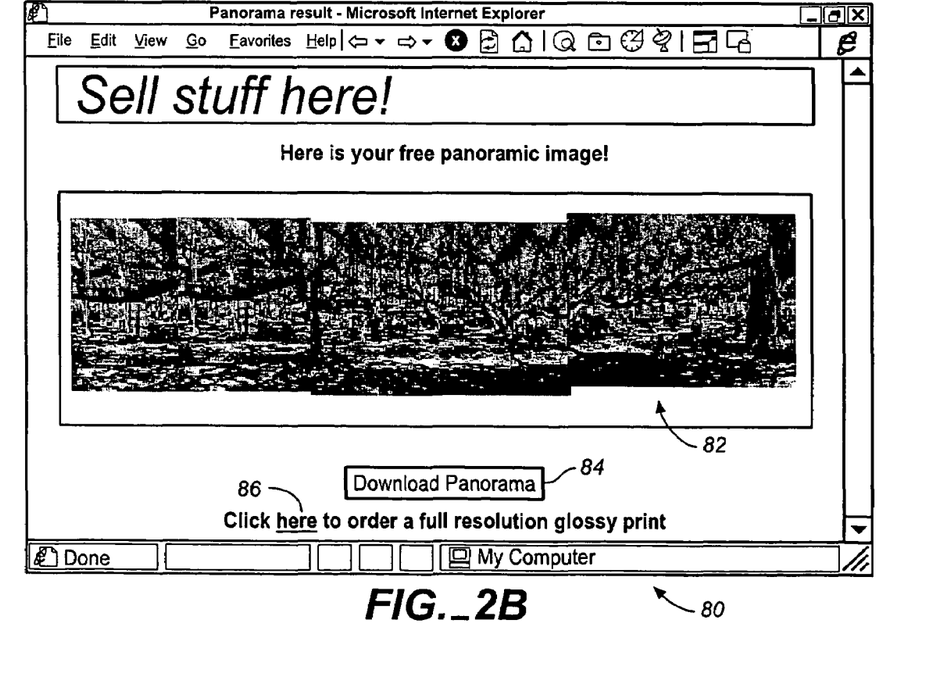
FIG. 2B is a web page presented by the server of FIG. 1 to transmit a panoramic image created when the server merges the images of FIG. 2A.

As shown in FIG. 2B, the output interface 46 of the network server 42 creates a web page 80 containing the panoramic image 82 created by image stitching software 48 from the images 11a-11d. The output interface 46 transmits the web page 80 to the client computer 14, 16, 18 through the network interface 30 and the network 13. The client computer 14, 16, 18 displays the panoramic image 82 to the user, for example, on a web browser associated with the computer. The web page 80 also includes a download button 84 that the user can click on to download the panoramic image from the server 12. Additionally, the web page 80 contains a hyperlink 86 that the user may click to order a full-resolution glossy print of the image.

Figure 3:
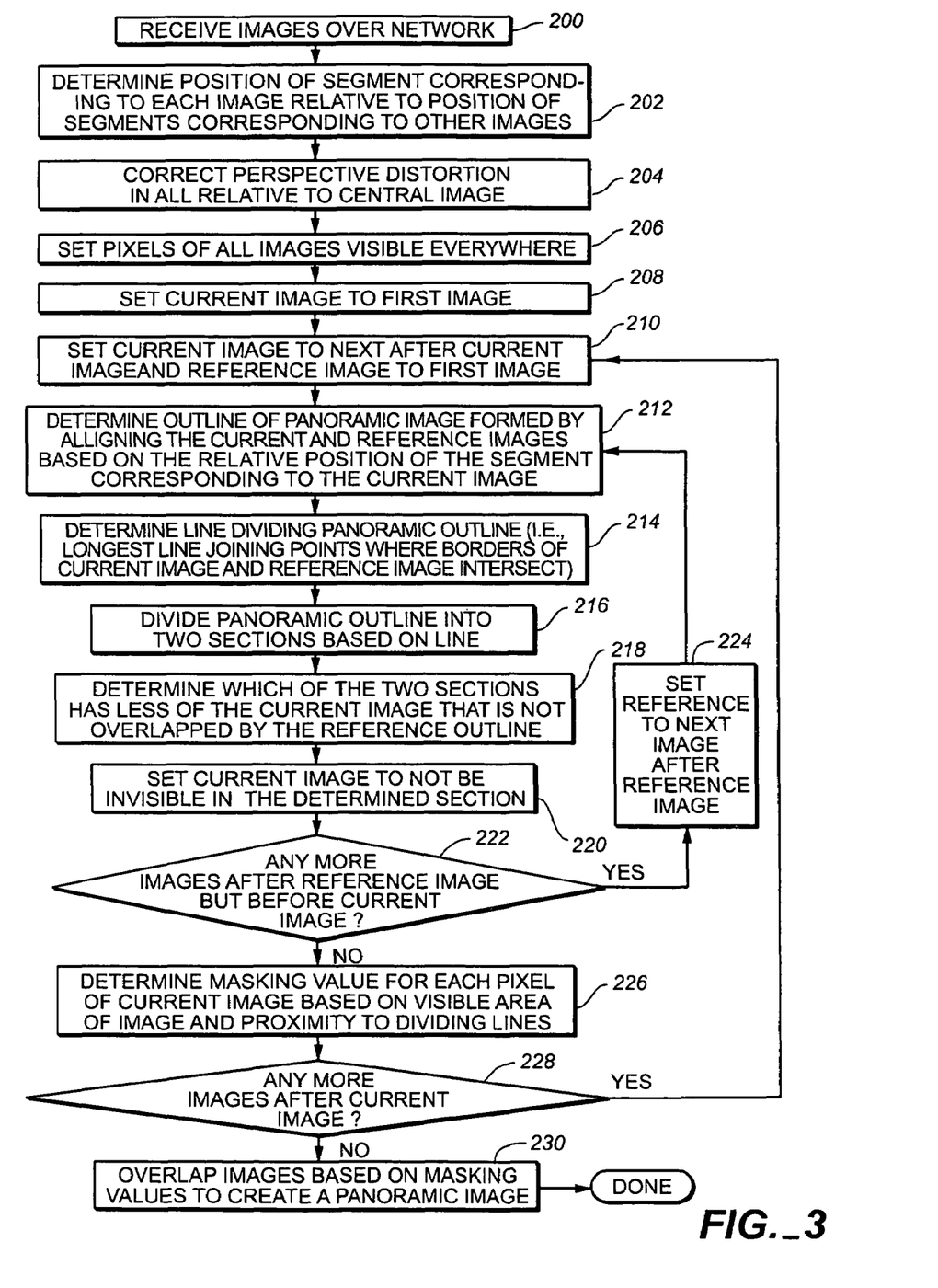
FIG. 3 is a flow chart of the process performed by the server of FIG. 1 to merge the images, including determining relative positions of the images, correcting perspective distortion in the images, and blending the images.

As shown in FIG. 3, the process for merging images implemented by image stitching software 48 (FIG. 1) will be described. Upon receiving (200) the images to be merged from image input interface 49, the positioning module 50 (FIG. 1) determines (202) the position of the segment of the view depicted in each of the image relative to the position of the segment of the view depicted in the other images.

Figure 4A:
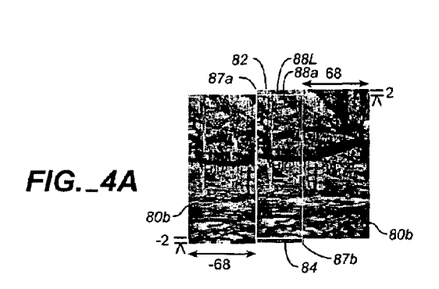
FIGS. 4A-4F illustrate intermediate steps in merging images.
Figure 4B:
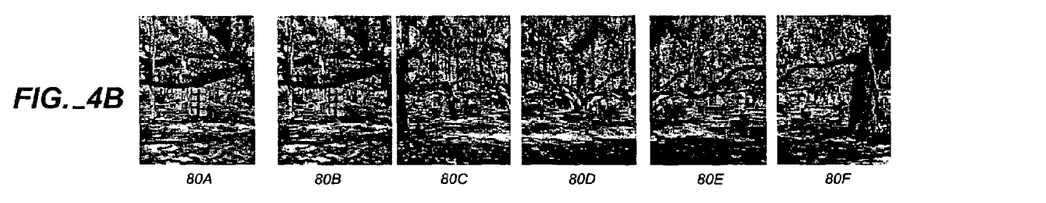

For example, as shown in FIGS. 4A and 4B, the positioning module 50 uses the two image positioner 60 to determine how much a first image 80a needs to be moved relative to a second image 80b so that a certain object depicted in both of the images 80a, 80b has its depiction in the second image 80a on top of its depiction in the first image 80b. In FIG. 4A, the image 80b must be moved 68 pixels to the right and 2 pixels upwards so that a branch 82 which is depicted in both image 80a, 80b has its depiction in the second image 80b on top of its depiction in the first image 80a. This ensures that the two images 80a, 80b are positioned so that the images 80a, 80b continue into each other as seamlessly as possible without altering the pixels of the images.

The two-image positioner 60 determines the relative position ("offset") of the two images, for example, based on the cross-spectrum method described in "Direct Estimation of Displacement Histograms," proceedings of the OSA meeting on image understanding and machine vision, June 1989, Bernd Girod and David Kuo ("Girod"), the disclosure of which is incorporated by reference in this specification. The Girod method returns a probability density function (see FIG. 3 of Girod) that has a peak at the value of the relative displacement. Two-image positioner 60 determines the relative position by first finding the location of the peak, which gives the magnitude of the relative position. Two-image positioner 60 also finds the highest value of the probability density function that is outside a five-pixel radius of the peak, and computes a confidence value in the relative position by subtracting the ratio of the highest value outside the five-pixel radius and the value of the peak from 1.

Although Girod discloses how to compute the relative distances the two images have to be moved, Girod's method does not determine the direction that the images have to be moved relative to each other. Consequently, after performing the Girod method, there are four possible relative positions depending on whether the image is moved to the left and up, left and down, right and up, or right and down. To determine the direction that the images have to be moved relative to each other, the two-image positioner determines a pair of overlapping segments 88a, 88b of the two images 80a, 80b for each of the possible relative positions. For each pair of determined overlapping segments, the two-image positioner computes the correlation between the overlapping segments according to the formula:

$$q = \frac{E(p_0 p_1) - E(p_0)E(p_1)}{\sqrt{E(p_0^2) - E(p_0)^2} \sqrt{E(p_1^2) - E(p_1)^2}}$$

where:

$E(p_0)$ is the average value of the pixels in the first image segment 88a;

$E(p_1)$ is the average value of the pixels in the first image segment 88b;

$E(p_0^2)$ is the average of the square of the values of the pixels in the first segment 88a;

$E(p_1^2)$ is the average of the square of the values of the pixels in the second segment 88b; and $E(p_0 p_1)$ is the average of the product of the values of overlapping pixels of the first segment 88a. and the second segment 88b.

and q is the correlation of the two image segments.

The actual relative position of the first image relative 80a relative to the second image 80b yields the greatest value for the correlation, q. Relative positions that yield very small overlapping segments are discarded because the correlation for the small segments is likely to yield false positive results.

The two-image positioner repeats the process described above for each pair of the images 80a-80f to yield "adjacent lists" 86a-86f, which contain the relative positions of the images. For example, from the adjacent list 86a, the image 80b must he moved 68 pixels to the left and two pixels upwards relative to image 80a. Similarly, from the adjacent list 86b, image 80a must be moved 68 pixels to the right (from the negative sign) and two pixels downwards (from the negative sign) relative to image 80b, while image 80c must be moved 69 pixels to the left and 4 pixels upwards relative to image 80b. Based on the relative positions of the pairs of images, the multiple image positioner 62 determines how the images should be translated relative to each other to form the panoramic image, as will be described below.

Figure 4C:
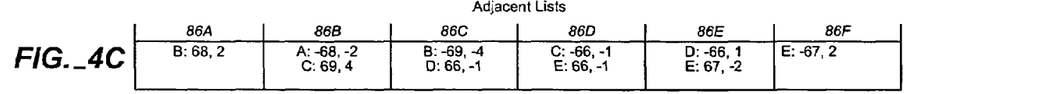
Figure 4D:
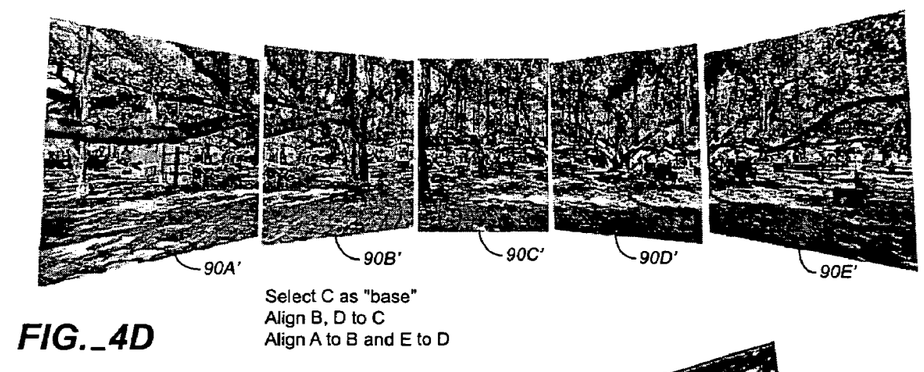

Referring again to FIG. 3, after determining (202) the positions of each of the segments relative to the other segments, the perspective corrector 52 corrects (204) perspective distortion in the images. Multiple-image corrector 66 of the perspective corrector 52 selects pairs of images to be corrected, as will be described below, and two-image corrector 64 corrects for perspective in one of the images relative to the other. Two-image corrector 64 uses, for example, the virtual bellows method of perspective correction described in "Virtual Bellows: High Quality Stills from Video," proceedings of the first IEEE international conference on image processing, November 1994, Steve Mann and Rosalind Picard ("Mann"), the disclosure of which is incorporated by reference in this specification. Thus, perspective corrector 52 corrects perspective distortion in the images 80a-80f (FIG. 4B) to yield substantially trapezoidal corrected images 90a-90e (FIG. 4D). The multiple image corrector 66 also arranges the images in the order in which they should be blended as will be described later.

Referring again to FIG. 3, stitching software 48 (FIG. 1) then sets (206) a visible property of the pixels of all the images to indicate that all the pixels of all the images start as being visible. The stitching software then sets (208) the current image to the first image 80a (FIG. 4A) and proceeds to determine the visible area of each of the images as described below.

The stitching software 48 sets (210) the current image to be the next image 80b after the current image 80a and sets the reference image to be the first image 80a. Thereby leaving all the pixels of the first image visible. Although all the pixels of the first image are set visible, some of the pixels of the first image may be obstructed or masked out by visible portions of subsequent images, as described later.

The dividing-line determiner 54 (FIG. 1) determines (212) an outline 85 (FIG. 4F) of a composite image formed by aligning the current image and the reference image 80a (as previously described with reference to FIG. 4A). The dividing-line determiner 54 also determines a pair of points 87a, 87b where the outlines of the aligned images intersect, thereby defining (214) a line 89 that joins the points 87a, 87b and divides (216) the panoramic outline 85 into two sections 81, 83 (216). If the outlines of the aligned images intersect at more than two points, the dividing-line determiner 54 selects the two intersection points that are furthest apart from each other to define the dividing line 89. The dividing-line determiner 54 then determines (218) which one of the two sections 81, 83 has less of the current image 80*b* that is not overlapped by the reference image 80*a* and sets (220) that section 87*a* of the current image 80*b* to be invisible. In the example of FIG. 4F, the section 83 has none of the current image that is not overlapped by the first image 80*a*. Consequently, the portions of the image profile 85 contained within the section 84 are set invisible, leaving the hashed section 82 of the image 80*b* visible.

The stitching software 48 checks (222) whether there are any more images between the reference image 80*a* and the current image 80*b*. If there are more images, the stitching software 48 sets (224) the reference image to be the next image after the current reference image and repeats the process of setting a section of the current image 80*b* invisible (208-220) as described above. Otherwise, if there are no more images, the blending mask determiner 56 (FIG. 1) determines (226) the pixels within the current image that will mask out pixels of earlier images. Only visible pixels 81 of the current image 80*b* mask out pixels of earlier images 80*a*. Consequently, the mask value of pixels contained within the region 81 is set to "1", while the mask property of pixels contained within the region 84 is set to "0".

After determining the mask values of the image, the stitching software 48 checks (228) whether there are any images after the current images. If there are more images, the stitching software sets (210) a new current image to be the next image after the current image and proceeds to determine the mask values of the new current image (212-226). The processing of subsequent images 80*c*-80*f* is preformed using the techniques that have been described above.

Figure 4E:
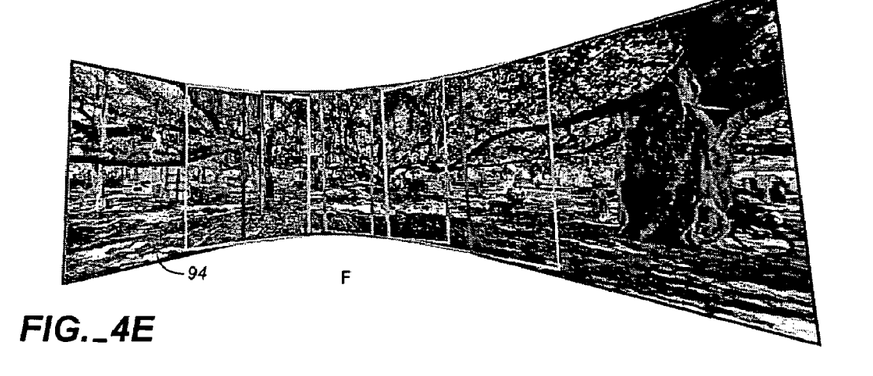
Figure 4F:
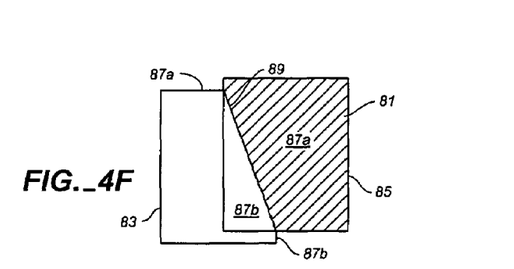

If there are no more images after the current image, the image blender 58 overlaps (230) the images 80*a*-80*f* based on the masking value to create the panoramic image 94 (FIG. 4E). The section 87*a* of the second image 80*b* with a mask value of 1 is first composited on the first image, thereby obstructing the part of the first image that is to the right of the dividing line 89. The portions of the third image 80*c* with a mask value of 90 are then composited on the composite image from the first 80*a* and second 80*b* image to create another image, and so on, until the composite image 94 is created. Thus, image stitching software merges images 80*a*-80*f* depicting sections of a scene to create a panoramic image of the whole scene.

Determining the Relative Positions of Images

Figure 5A:
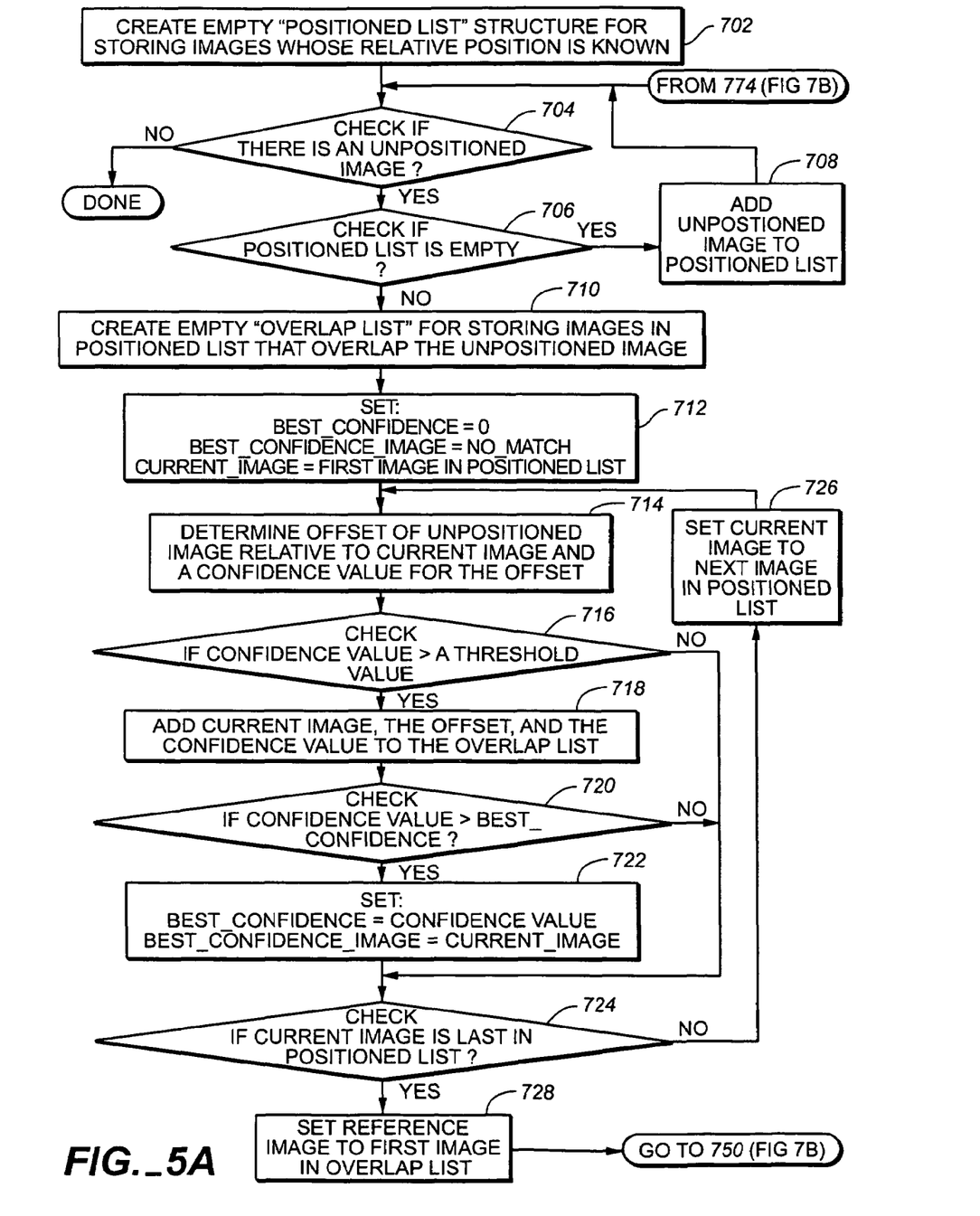
FIGS. 5A and 5B are flow charts of the process performed by the server to determine the relative positions of the images.
Figure 5B:
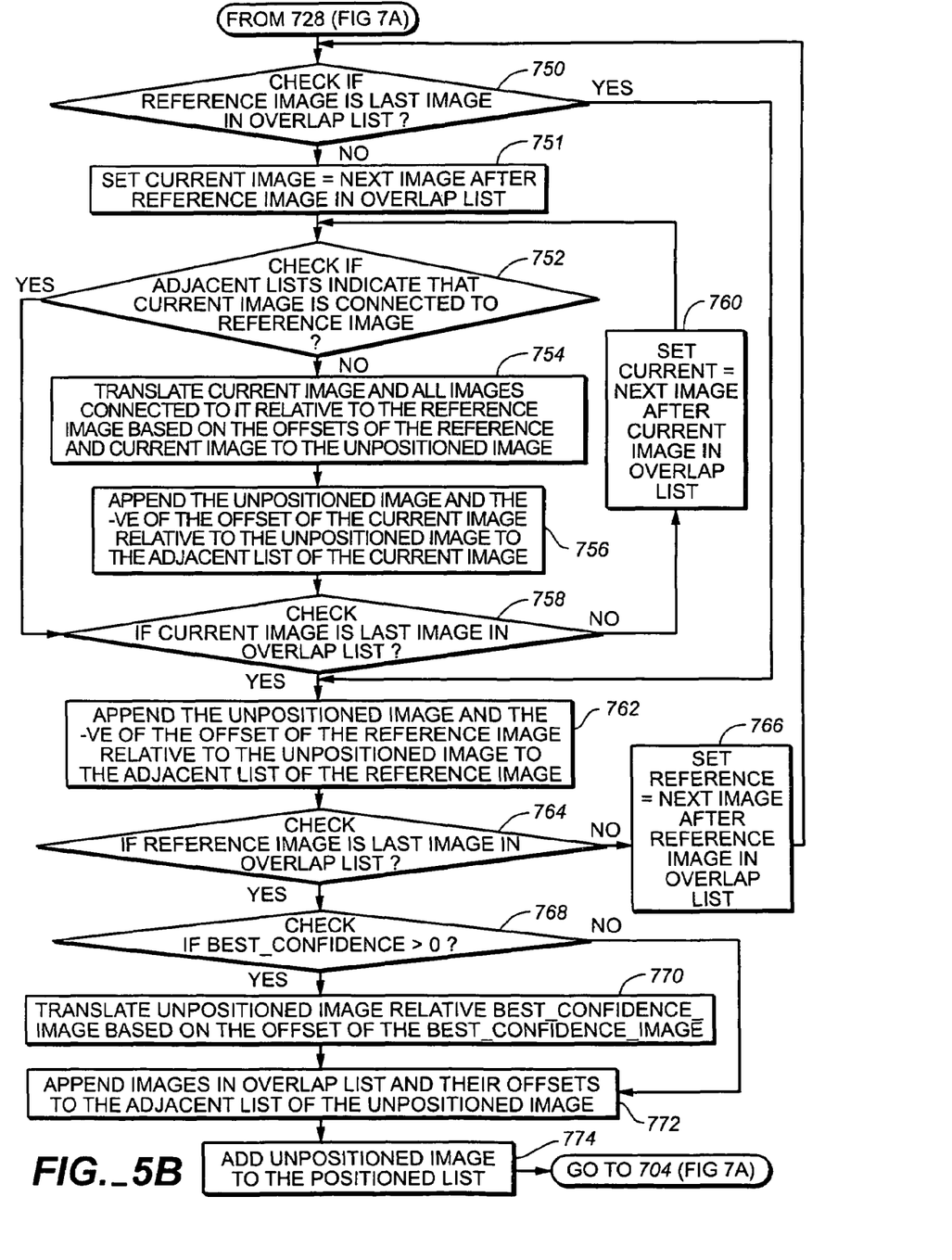

As shown in FIGS. 5A and 5B, the process performed by the multiple-image positioning module 62 to position the images relative to each other begins when the multiple-image positioning module 62 creates (702) an empty "positioned list" for storing images whose translation in pixels relative to the other images has been determined. The multiple-image positioning module 62 checks (704) the input interface 49 to determine whether any images have been received that are not on the "positioned list." If no images have been received then the multiple-image positioning module 62 stops the process. Otherwise, if an unpositioned image has been received, the multiple-image positioning module 62 checks (706) if the positioned list is empty. If the positioned list is empty, the multiple-image positioning module 62 adds (708) the unpositioned image to the positioned list, since there are no images to position the image relative to, and checks (704) if there are any other unpositioned images.

Otherwise, if the positioned list is not empty, multiple-image positioning module 62 creates (710) an empty "overlap list" for storing images from the positioned list which overlap the unpositioned image. The multiple-image positioning module 62 then begins the process of determining the overlapping images by setting (712) a best—confidence value to zero, a best_confidence_image to NO MATCH, and a current image to the first image in the positioned list. The best_confidence_image represents the image that the process considers most likely to overlap the unpositioned image, while the best_confidence value is a statistical measure of confidence that the best_confidence_image overlaps the unpositioned image. Since multiple-image positioning module 62 has not found an image that overlaps the unpositioned image when the overlap list is empty, the best_confidence_image and the best_confidence are initially set (712) as described.

The two-image positioner 60 then determines (714) the relative position ("offset") of the unpositioned image relative to the current image and a confidence value for the offset, as previously described with reference to FIGS. 4A-4C. The multiple-image positioner 62 then checks (716) if the confidence value is greater than a threshold confidence value which must be met by overlapping images. If it is not, then the multiple-image positioner 62 checks (724) whether the current image is the last image in the positioned list. Otherwise, if the confidence value is greater than the threshold confidence value, the multiple-image positioner 62 adds (718) the current image, its position offset, and the confidence value of the position offset to the overlap list. The multiple-image positioner 62 checks (720) if the confidence value is greater than the best_confidence value. If it is not, the multiple-image positioner 62 checks (724) if the current image is the last image in the positioned list. Otherwise, if it is, the multiple-image positioner 62 makes the current image the best_confidence image by setting (722) the best_confidence_image to be the current image and the best_confidence value to be the confidence value of the current image.

The multiple-image positioner 62 then checks (724) whether the current image is the last image in the positioned list. If it is not, the multiple-image positioner 62 sets (726) the current image to be the next image in the positioned list and repeats the processes (714-724) for the new current image. Thus, the multiple-image positioner 62 and the two-image positioner 60 determine the relative positions of the unpositioned image relative to the positioned images while keeping track of a confidence value for the relative positions.

Figure 7:
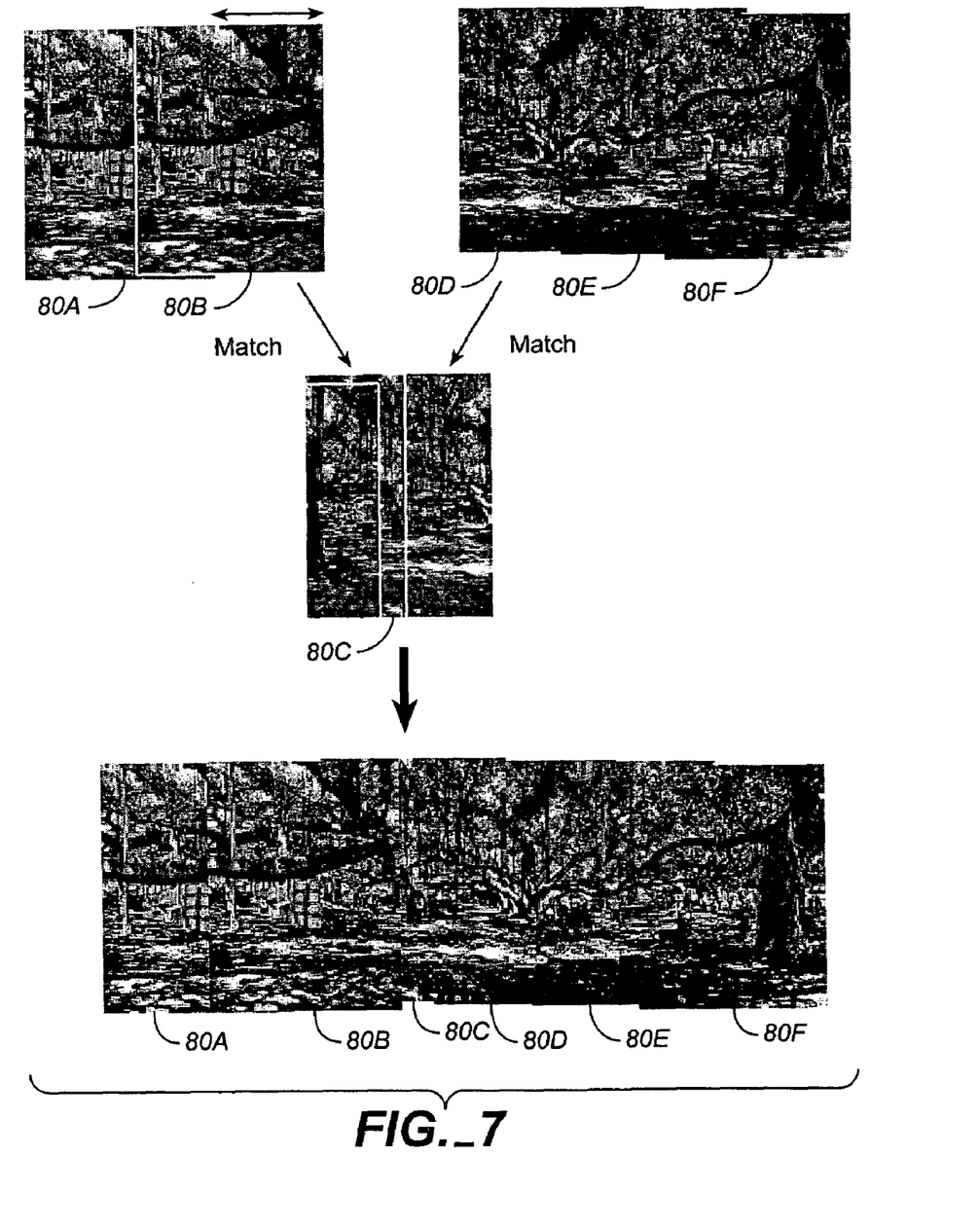
FIG. 7 shows images that are in the process of being positioned relative to each other.

Otherwise, if the current image is the last image in the list, the multiple-image positioner 62 sets (728) a reference image to be the first image in the overlap list and checks (750) whether the reference image is the last image in the overlap list. If the reference image is the last image, the multiple-image positioner 62 appends (762) the unpositioned image to an "adjacent list" of images that are adjacent to reference image along with the position of the unpositioned image relative to the reference image, which is given by the negative of the positioned offset. Otherwise, if the reference image is not the last image in the overlap list, the multiple-image positioner 62 determines whether the unpositioned image connects two previously disjoint sets of images as will described below. For example, as shown in FIG. 7, the multiple-image positioner 62 may have determined that images 80*a* and 80*b* are positioned adjacent to each other and that images 80*d* and 80*f* are connected to each other by image 80*e*, resulting in two disjoint sets 80*a*, 80*b* and 80*d*-80*f* of images. The following steps would determine that a new image 80*c* is positioned adjacent to images 80*b*, 80d from the two sets and, therefore, joins the previously disjoint set of images to create one set 80a-80f of connected images.

The multiple-image positioner 62 begins by checking (750) if the reference image is the last image in the overlap list. If it is the last image, the multiple-image positioner 62 appends (762) the unpositioned image to the "adjacent list" of images that are adjacent to the reference image. Otherwise, if it is not the last image in the overlap list, the multiple-image positioner 62 sets (751) the current image to be the next image in the overlap list after the reference image. The multiple-image positioner 62 then checks (752) if the adjacent lists of the reference image and the current image indicate that the reference and current images are adjacent to each other. If the adjacent lists do indicate that they are adjacent, the multiple-image positioner 62 checks (758) whether the current image is the last image in the overlap list. Otherwise, if the adjacent lists do not indicate that the two images are adjacent, the multiple-image positioner 62 translates (754) the current image and all the images that are connected to it relative to the reference image based on the offsets of the current image and the reference image relative to the unpositioned image. Thus, the multiple-image positioner 62 uses the positions of the current image and the reference image relative to the unpositioned image to position the current image and the reference image relative to each other. The multiple-image positioner 62 then appends (756) the unpositioned image to the "adjacent list" of images that are adjacent to the current image.

The multiple-image positioner 62 then checks (758) if the current image is the last image in the overlap list. If it is not, the multiple-image positioner 62 sets (760) the current image to be the next image in the overlap list and checks (752) if the adjacent lists indicate that the new current image is connected to the reference image. Thus, the multiple-image positioner 62 goes through the overlap list connecting sets of images that were previously disjoint from the reference image but are now connected to the reference image by the unpositioned image.

The multiple-image positioner 62 then appends (762) the unpositioned image to the "adjacent list" of images that are adjacent to the reference image and checks (764) whether the reference image is the last image in the overlap list. If the reference image is not the last image in the overlap list, the multiple-image positioner 62 sets (766) the reference image to be the next image after the reference image. The process of steps (750-764) is repeated for the new reference image to determine which disjointed sets of images are connected by the unpositioned image and to add the unpositioned image to the adjacent lists of images that are adjacent to the positioned image.

The multiple-image positioner 62 checks (768) whether the best_confidence value is greater than zero to determine whether an overlapping image was found in the process (712-724) that was described above. If the best_confidence value is not greater than zero, the multiple-image positioner 62 adds (772) the images in the overlap list and their offsets to the adjacent list of the unpositioned image, to keep a permanent record of the images that are adjacent to the unpositioned image. Otherwise, the multiple-image positioner 62 translates (770) the unpositioned image relative the best_confidence_image based on the position offset of the best_confidence image. By translating the unpositioned image based on the positional offset that is most certain, the multiple-image positioner 62 moves the unpositioned image to its most likely position. The multiple-image positioner 62 adds (772) the images in the overlap list and their offsets to the adjacent list of the unpositioned image, to keep a permanent record of the images that are adjacent to the unpositioned image and adds (774) the unpositioned image to the positioned list.

The multiple-image positioner 62 then checks (704) whether there are other images that have not been relatively positioned, and processes (706-774) subsequent unpositioned images as described above. The process of FIGS. 5A and 5B determines the relative positions of the images without the intervention of a human operator.

Correcting Perspective Distortion

Figure 6:
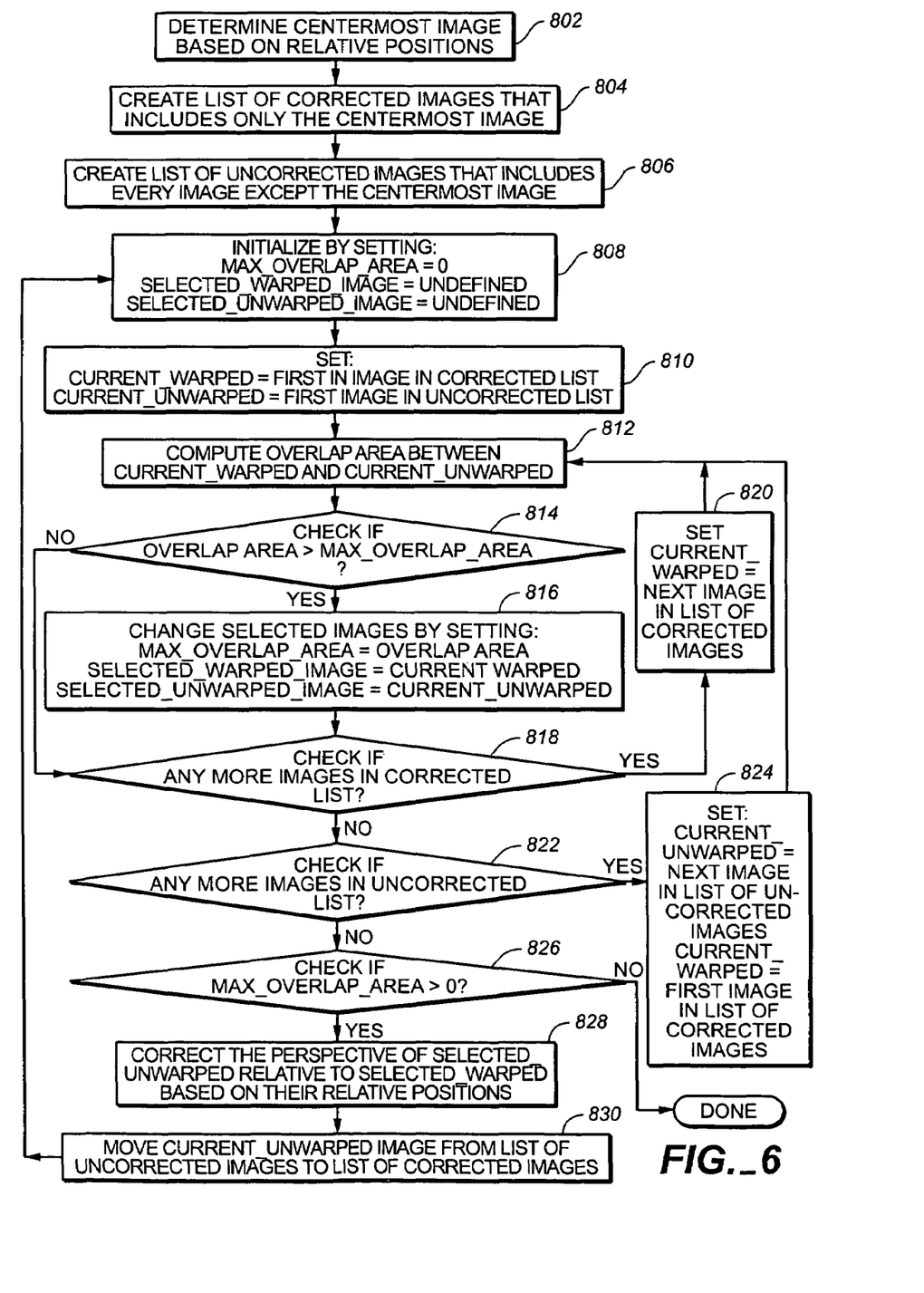
FIG. 6 is a flow chart of the process performed by the server to correct perspective distortion in the images.

As shown in FIG. 6, multiple-image corrector 66 corrects perspective distortion in the images in a process that begins by determining (802) the most centrally positioned of the images ("centermost image") based on the relative positions stored within the adjacent lists created by the multiple-image positioner 62 (756, 772 FIG. 5B). For example, in FIG. 4B, the centermost image may be 80c. The multiple-image corrector 66 does not correct perspective distortion in the centermost image, but instead corrects perspective distortion of the other images relative to the centermost image.

The multiple-image corrector 66 creates (804) a list of images whose perspective distortion has been corrected ("list of corrected images") that includes only the centermost image. The multiple-image corrector 66 also creates (806) a list of images whose perspective distortion has not been corrected ("list of uncorrected images") that includes all of the images 80a, 80b, 80d-80f (FIG. 4B). The multiple-image corrector 66 then initializes the correction process by setting (808) the value of the maximum overlap area ("max_overlap-area") to zero, the image from the corrected list that will be used in perspective correction ("selected_warped") to be undefined, and the image whose perspective is to corrected ("selected—unwarped") to also be undefined.

The multiple-image corrector 66 then sets (810) the current_warped image to be the first image in the corrected list and the current_unwarped image to be the first image in the uncorrected list. The multiple-image corrector 66 computes (812) an overlap area between the current_warped image and the current_unwarped image, based on the relative positions (from the adjacent lists) and the sizes of the two images. The multiple-image corrector 66 checks (814) if the overlap area is greater than max_overlap_area. If it is not, the multiple image corrector 66 checks (818) if there are any more images in the corrected list. Otherwise, if the overlap area is greater than max_overlap_area, the multiple-image corrector 66 changes (816) the images that will be used in perspective correction by setting max_overlap_area to be the overlap area, setting the selected_warped image to be the current_warped image, and setting the selected_unwarped image to be the current_unwarped image.

The multiple-image corrector 66 then checks (818) if there are any more images in the corrected list. If there are more images, the image corrector sets (820) the current_warped image to be the next image in the corrected list and repeats the process (812-820) of conditionally changing the selected images. Thus, the image corrector 66 identifies the corrected image that most overlaps the current_unwarped image.

The multiple-image corrector 66 then checks (822) if there are any more images in the uncorrected list. If there are more images in the uncorrected list, the multiple-image corrector 66 sets (824) the current_unwarped image to be the next image in the uncorrected image and sets the current_warped image to be the first image in the list of corrected images. The multiple-image corrector 66 repeats the process (812-824) of changing the selected images to identify a corrected and an uncorrected image that overlap each other more than any other corrected and uncorrected images.

If there are no more images in the uncorrected list, the multiple-image corrector 66 checks (826) if max_overlap_area is greater than zero. If max_overlap_area is not greater than zero, no overlapping images were identified and the multiple-image corrector 66 terminates the process. Otherwise, if max_overlap_area is greater than zero, multiple-image corrector 66 corrects (828) the perspective of the selected_unwarped image based on its position relative to the selected warped image. The multiple-image corrector then moves (830) the selected_unwarped image from the list of uncorrected images to the list of corrected images and repeats the process (808-830) of correcting perspective distortion in the uncorrected image that most overlaps a corrected image. Thus the multiple-image corrector 66 corrects the perspective distortions of the images by selecting the uncorrected image that most overlaps a corrected image and correcting its distortion based on its position relative to the corrected image. The process of FIG. 6 results in realistic corrections and can be performed without the intervention of a human operator.

A number of embodiments of the invention have been described. Nevertheless, it will be understood that various modifications may be made without departing from the spirit and scope of the invention. For example, the image 80 to be blended may be obtained form a digital camera, storage 16, or a network 26. The positioning module may determine the relative positions of segments depicted in two images by prompting the user to use the pointing device 24 to click on an object, such as the top left corner of the doorway, that is depicted in both of the images and determining the relative positions based on the positions that the user clicks on.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. Certain steps described in the example above may be omitted in certain instances. For example, certain images may be merged without correcting perspective distortion in the images.

What is claimed is:

1. A system comprising:
   a user interface device; and
   one or more computers operable to interact with the user interface device and to perform operations to:
      receive a first image representing a first segment of the view and a second image representing a second segment of the view;
      determine the position of the second segment of the view relative to the first segment of the view without the aid of positioning information provided by a human operator; and
      blend the first image with the second image based solely on the content of the images and the determined position of the second segment relative to the first segment to merge the first image and the second image into a panoramic image of the view, wherein the operations to blend comprise operations to:
         divide the second image into a first portion and a second portion based on the position of the second segment relative to the first segment; and
         composite the first portion of the second image on the first image at a relative position of the second segment relative to the first segment to produce the panoramic image, the compositing of the first portion of the second image causing the first portion to mask out a part of the first image.

2. The system of claim 1, wherein the one or more computers comprise a server operable to interact with the user interface device through a data communication network, and the user interface device is operable to interact with the server as a client.

3. The system of claim 2, wherein the user interface device comprises a personal computer running a web browser, a personal digital assistant, or other computing device running a browser application.

4. The system of claim 1, wherein the one or more computers comprises one personal computer, and the personal computer includes the user interface device.

5. A system for merging a set of images, each image representing a corresponding segment of a view, the set including a first image representing a first segment of the view, a second image representing a second segment of the view, and a third image representing a third segment of the view, where the third segment of the view overlaps both the first segment and the second segment of the view, the system comprising:
   a user interface device; and
   one or more computers operable to interact with the user interface device and to:
      determine a first relative position of the third segment relative to the first segment of the view by processing the content of the third image and the first image;
      determine a first overlap area of the first image and the third image based on the determined first relative position;

determine a second relative position of the third segment relative to the second segment of the view by processing the content of the third image and the second image;

determine a second overlap area of the second image and the third image based on the determined second relative position; and if the first overlap area is greater than the second overlap area, offset the position of the third image relative to the first image and the second image based on the determined first relative position, and otherwise, offset the position of the third image relative to the first image and the second image based on the determined second relative position.

6. The system of claim 5, wherein the one or more computers comprise a server operable to interact with the user interface device through a data communication network, and the user interface device is operable to interact with the server as a client.

7. The system of claim 6, wherein the user interface device comprises a personal computer running a web browser, a personal digital assistant, or other computing device running a browser application.

8. The system of claim 5, wherein the one or more computers comprises one personal computer, and the personal computer includes the user interface device.

9. A method of merging images of segments of a view, comprising:

receiving a first image representing a first segment of the view at a server;

receiving a second image representing a second segment of the view at the server without the server receiving any information about the position of the second segment relative to the first segment;

receiving commands sent from a client to merge the first image and the second image into a panoramic image of the view;

determining the position of the second segment of the view relative to the first segment of the view without the aid of positioning information provided by a human operator;

blending the first image with the second image based solely on the content of the images and the determined position of the second segment relative to the first segment to merge the first image and the second image into a panoramic image of the view, wherein the blending comprises:

dividing the second image into a first portion and a second portion based on the position of the second segment relative to the first segment; and compositing the first portion of the second image on the first image at a relative position of the second segment relative to the first segment to produce the panoramic image, the compositing of the first portion of the second image causing the first portion to mask out a part of the first image.

10. The method of claim 9, further comprising:

transmitting a panoramic image of the view to the client, the panoramic image being a composite of the first image and the second image.

* * * * *